Figures 1, 2:
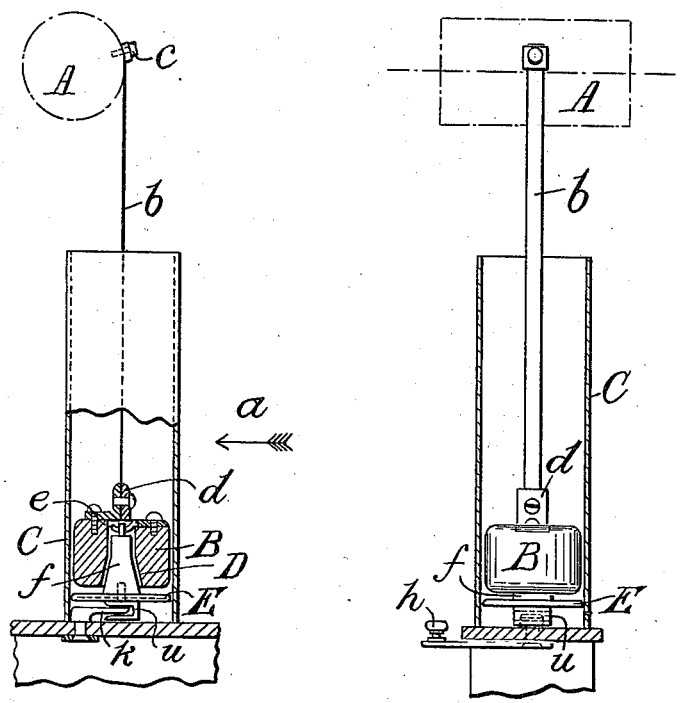

E. G. HEDMAN.
COUNTERWEIGHT MECHANISM FOR WEIGHING APPARATUS.
APPLICATION FILED OCT. 12, 1911.

1,045,401.

Patented Nov. 26, 1912.

ptp
UNITED STATES PATENT OFFICE.

ERIK GUSTAF HEDMAN, OF STOCKHOLM, SWEDEN.

COUNTERWEIGHT MECHANISM FOR WEIGHING APPARATUS.

1,045,401. Specification of Letters Patent. Patented Nov. 26, 1912.

Original application filed February 28, 1911, Serial No. 611,432. Divided and this application filed October 12, 1911. Serial No. 654,295.

*To all whom it may concern:*

Be it known that I, ERIK GUSTAF HEDMAN, a subject of the King of Sweden, and residing at 46 Kungsholmsgatan, Stockholm, Sweden, have invented certain new and useful Improvements in Counterweight Mechanism for Weighing Apparatus, of which the following is a specification.

The present invention relates to automatic weighing machines in which a freely suspended counterweight is moved vertically or substantially so under the action of the load and has for its object to provide improved means for guiding, or controlling the sidewise movements of the counterweight, especially during transit, and to provide in connection therewith improved means for damping or checking the vertical movements of the counterweight.

The invention which is the subject of this specification was originally set forth in my co-pending application, Serial No. 611,432, filed Feb. 28, 1911, of which application the present application is a division.

The invention is illustrated by the example shown in the drawings herewith of which:—

Figure 1 is a part sectional view of the counterweight and guiding and checking means, the roller from which the counterweight is suspended, in this application, being shown by broken lines. Fig. 2 is a part sectional view corresponding to Fig. 1, looking in the direction indicated by the arrow *a* of that figure.

B is the main portion of a counterweight freely suspended by means of a band *b* from a roller A shown by broken lines. The band *b* is attached to the roller A by a clamp *c* and to the counterweight by a clamp *d*. The main portion of the counterweight B is suspended within a cylinder C and is of a diameter sufficiently less than that of the cylinder to insure that it will not come in contact therewith under normal working notwitstanding that there is in practice always some lateral movement of the counterweight. If the weighing machine receives an appreciable jar the counterweight is prevented from swinging far by coming into contact with the cylinder. It is very important that the counterweight should be thus controlled during transit or when the machine is being continually moved locally.

The portion B has a hollow D formed therein at the top of which is a hook *e* from which hangs a stem *f* having rigidly attached to its lower end a disk E of a diameter only slightly less than the inner diameter of the cylinder and adapted to act as a piston therein constituting with the cylinder an air brake to check or damp the vertical movement of the counterweight. The disk E and its stem *f* are light compared with the rest of the counterweight so that if the disk is moved by the swinging of the counterweight into contact with the cylinder it will touch it only very lightly as it is freely suspended from the portion B of the counterweight and will not for that cause interfere to any appreciable extent with vertical movement whereas if the disk were rigid with the rest of the counterweight or if the portion B itself were made of sufficient diameter to act as a piston it would frequently come against the cylinder with considerable force, owing to its mass, and jamming would often occur causing the machine to become temporarily inoperative.

For locking the counterweight when desired a handle *h* rigid with an arm *k* is provided adapted to be turned into engagement with a hook *u* of the counterweight so that it cannot be moved upward.

Having fully described my invention what I claim and desire to secure by Letters Patent is:—

1. In a weighing apparatus a counterweight which moves in a vertical direction under the action of the load, a vertical cylinder within which the counterweight moves said cylinder having an internal diameter sufficiently greater than the diameter of the main portion of the counterweight to insure that the latter will not touch the cylinder under the slight lateral oscillations of ordinary use and a relatively light portion of said counterweight freely suspended in relation to the main portion and being of a diameter only slightly less than the internal diameter of the cylinder and acting as a piston therein to damp the vertical movement of the counterweight.

2. In a weighing apparatus, a counterweight which moves in a vertical direction under the action of the load, a vertical cylinder within which the counterweight moves said cylinder having an internal diameter sufficiently greater than the diameter of the main portion of the counterweight to insure that the latter will not touch the cylinder under the slight lateral oscillations of ordinary use, a relatively light disk-like portion freely suspended in relation to the main portion and being of a diameter only slightly less than the internal diameter of the cylinder, and a stem rigidly attached at its lower end to the disk-like portion and at its upper end pivoted to the main portion of the counterweight.

3. In a weighing apparatus, a counterweight which moves in a vertical direction under the action of the load, the main portion of the counterweight having a hollow formed therein from the underside thereof, a vertical cylinder within which the counterweight moves said cylinder having an internal diameter sufficiently greater than the diameter of the main portion of the counterweight to insure that the latter will not touch the cylinder under the slight lateral oscillations of ordinary use, a relatively light disk-like portion freely suspended in relation to the main portion and being of a diameter only slightly less than the internal diameter of the cylinder, and a stem rigidly attached at its lower end to the disk-like portion and at its upper end pivoted to the main portion of the counterweight at the upper end of said hollow.

4. In a weighing apparatus, a counterweight which moves in a vertical direction under the action of the load, the main portion of the counterweight having a hollow formed therein from the underside thereof, a vertical cylinder within which the counterweight moves said cylinder having an internal diameter sufficiently greater than the diameter of the main portion of the counterweight to insure that the latter will not touch the cylinder under the slight lateral oscillations of ordinary use, a relatively light disk-like portion freely suspended in relation to the main portion and being of a diameter only slightly less than the internal diameter of the cylinder, a stem rigidly attached at its lower end to the disk-like portion and at its upper end pivoted to the main portion of the counterweight at the upper end of the hollow, a hook on the underside of the disk-like portion and an arm operated by a suitable handle and adapted to engage with the hook to lock the counterweight when desired.

In witness whereof I have hereto signed my name this 12th day of September, 1911, in the presence of two subscribing witnesses.

ERIK GUSTAF HEDMAN.

Witnesses:
MAX VON STUCKRAD,
GRETA PRICU.

---

Copies of this patent may be obtained for five cents each, by addressing the "Commissioner of Patents, Washington, D. C."